United States Patent [19]

Hodgins et al.

[11] Patent Number: 5,124,227
[45] Date of Patent: Jun. 23, 1992

[54] PROTECTIVE OVERCOATS FOR DIAZO TYPE LAYERS

[75] Inventors: George Hodgins, Granby; Marie B. Ray, Ware, both of Mass.

[73] Assignee: Graphics Technology International Inc., South Hadley, Mass.

[21] Appl. No.: 494,212

[22] Filed: Mar. 15, 1990

[51] Int. Cl.⁵ .................................. G03C 1/52
[52] U.S. Cl. ........................ 430/162; 430/176; 430/273; 430/961
[58] Field of Search ............... 430/162, 272, 275, 271, 430/273, 176, 181

[56] References Cited

U.S. PATENT DOCUMENTS

| | | | |
|---|---|---|---|
| 2,993,803 | 7/1961 | Sulich et al. | 430/162 |
| 3,136,637 | 6/1964 | Larson | 430/162 |
| 3,418,469 | 12/1968 | Gold | 430/162 |
| 3,753,755 | 8/1973 | Olson | 430/273 |
| 3,895,949 | 7/1975 | Akamatsu et al. | 430/162 |
| 4,015,039 | 3/1977 | Segal et al. | 428/426 |
| 4,044,188 | 8/1977 | Segal | 428/283 |
| 4,088,492 | 5/1978 | Pope et al. | 430/162 |
| 4,098,943 | 7/1978 | Degginger et al. | 428/283 |
| 4,156,046 | 5/1979 | Lien et al. | 428/220 |
| 4,269,884 | 5/1981 | DellaVecchia et al. | 428/131 |
| 4,291,084 | 9/1981 | Segal | 428/303 |
| 4,293,606 | 10/1981 | Zollinger et al. | 428/203 |
| 4,306,007 | 12/1981 | Bialczak | 430/157 |
| 4,333,998 | 6/1982 | Leszyk | 430/12 |
| 4,337,107 | 6/1982 | Eshleman | 156/249 |
| 4,353,980 | 10/1982 | Helling et al. | 430/532 |
| 4,399,192 | 8/1983 | Russell | 428/412 |
| 4,469,543 | 9/1984 | Segal et al. | 428/287 |
| 4,471,018 | 9/1984 | Kritchevsky et al. | 428/220 |
| 4,497,887 | 2/1985 | Watanabe et al. | 430/138 |
| 4,501,810 | 2/1985 | Fromson et al. | 430/302 |
| 4,560,639 | 12/1985 | Sullivan | 430/122 |
| 4,587,199 | 5/1986 | Bennett | 430/260 |
| 4,599,299 | 7/1986 | Neiss et al. | 430/273 |
| 4,612,238 | 9/1986 | DellaVecchia et al. | 428/228 |
| 4,668,601 | 5/1987 | Kistner | 430/162 |
| 4,678,699 | 7/1987 | Kritchevsky et al. | 428/175 |
| 4,686,547 | 8/1987 | Hayashi et al. | 430/138 |
| 4,687,700 | 8/1987 | Hensel et al. | 428/213 |
| 4,718,956 | 1/1988 | Armstrong | 156/99 |
| 4,751,166 | 6/1988 | Platzer et al. | 430/160 |
| 4,777,113 | 10/1988 | Inoue et al. | 430/264 |

FOREIGN PATENT DOCUMENTS

| | | | |
|---|---|---|---|
| 678939 | 1/1964 | Canada | 430/273 |
| 54-47623 | 4/1979 | Japan | 430/162 |
| 62-205339 | 9/1987 | Japan | 430/162 |

OTHER PUBLICATIONS

Pigment Handbook, vol. 1, pp. 157-159.

Primary Examiner—Richard L. Schilling
Assistant Examiner—John S. Chu
Attorney, Agent, or Firm—Burns, Doane, Swecker & Mathis

[57] ABSTRACT

It surprisingly has been found that a protective coating composition for diazo-containing materials can be prepared from a cellulose ester and microcrystalline silica. The coating compositions of the invention provide protection for diazo-containing materials from physical and chemical damage. In particular, the protective coating compositions of the invention protect the diazo-containing materials from abrasion.

The invention further relates to a method for providing a protective coating on a diazo phototool comprising coating at least the surface of the diazo phototool containing diazo material with a composition comprising a cellulose ester and microcrystalline silica.

17 Claims, 1 Drawing Sheet

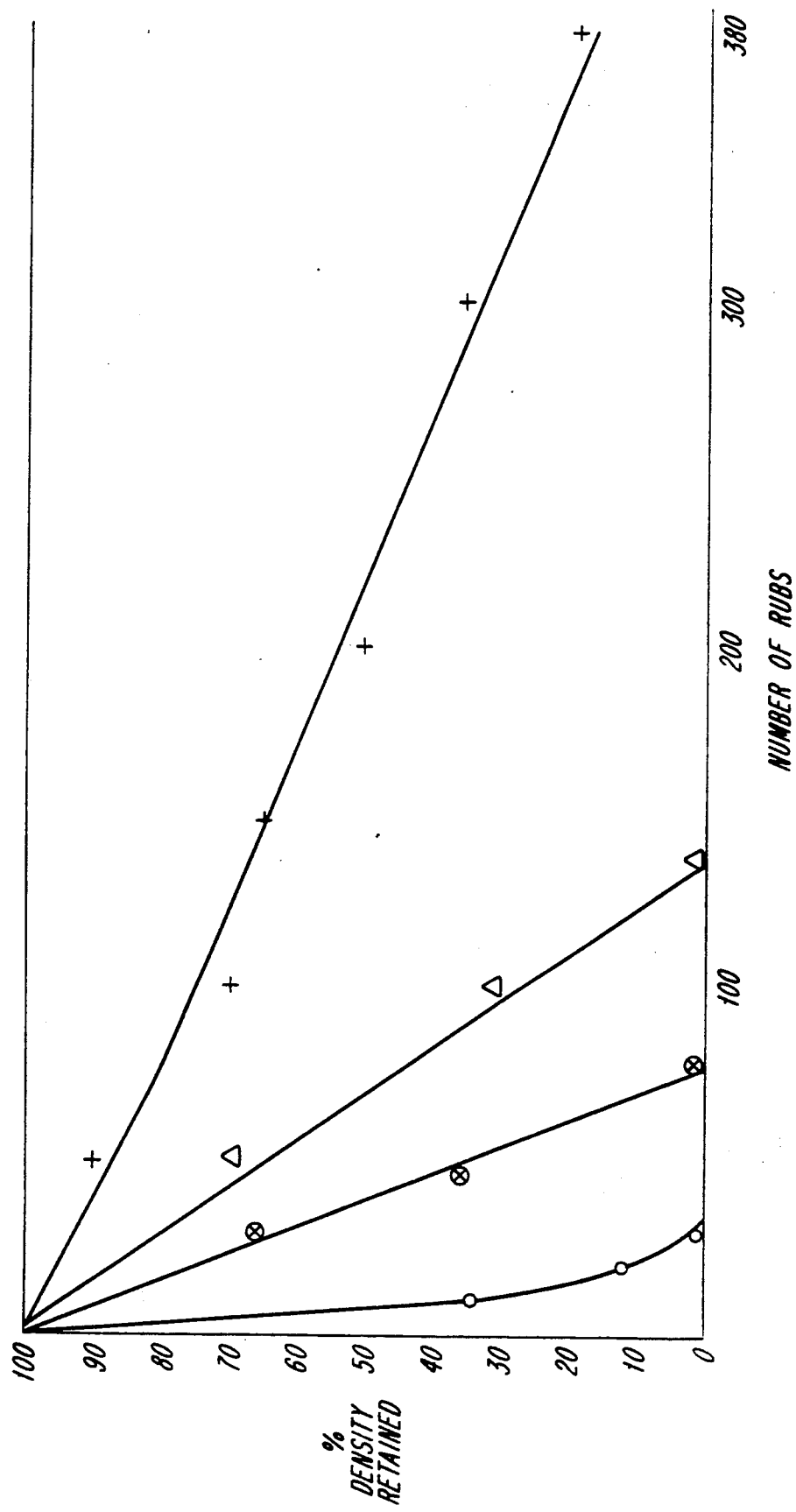

PROTECTIVE OVERCOATS FOR DIAZO TYPE LAYERS

FIELD OF THE INVENTION

This invention relates to structures containing diazo-type materials. More specifically, this invention relates to coating materials for protecting the surface of diazo-type materials.

BACKGROUND OF THE INVENTION

Diazo-type materials generally consist of a support carrying a light sensitive diazonium compound. Some diazo-type materials consist of the diazo material and other layers useful in improving an image to be obtained through the use of the diazo material. Diazo materials are useful for a wide range of applications, including phototool applications in the printed circuit industry, in the production of lithographic plates and for the production of heat-sensitive recording material, among others.

Generally diazo-type materials are made by applying a solution of a diazonium compound which may contain other materials such as couplers and optionally a resinous binder to a support. When the support is a plastic film intermediate, anchoring layers may be applied to the film surface to improve adhesion.

When diazo materials comprising a support and a diazonium compound are exposed to a light imagewise, especially ultra-violet (360–440 nm) light, the undecomposed diazonium compound may subsequently be converted into an azo dye thereby providing a recorded image.

Generally, photosensitive diazo materials are developed with water, an organic solvent, aqueous ammonia or an aqueous solution of a salt after photopolymerization or photodegradation. When moisture, water, various chemicals, foreign particles or fingerprints adhere to the layer of photosensitive diazo material during storage or handling, the utility of the photosensitive material is reduced. Moreover, the surface of the layer of photosensitive diazo material may be easily scratched, locally reducing intensity, which further decreases utility. In some cases, the diazo material is placed in contact with photoresist material which may contain chemicals such as monomers, photoinitiators or solvents which can adversely affect the diazo material. This adverse effect results in either a loss of azo dye density in the image areas or a density build-up in clear areas.

These physical and chemical degradations of photosensitive materials are common problems in the printed circuit industry, particularly in the use of phototools, or photographic masks or stencils bearing a circuit pattern. Such a stencil, which commonly is a diazo film on a polyester base through which a photoresist can be exposed, provides an intricate, complex image representing an electrical circuit. The image often consists of many fine lines and junctions spaced closely together. The phototool is used to make printed circuit boards by placing the phototool face down against a photoresist layer to make a contact print or slightly off contact print by exposing the photoresist to high intensity light (360–440 nm) through the phototool. In this way, a single phototool can be used to make up to hundreds of circuit boards.

After initial processing and during use, a phototool must be carefully inspected through a microscope or with automatic optical inspection equipment to insure that there are no breaks in the fine lines of the image which can produce an open circuit in the finished circuit board or unwanted density spots due to particles of dirt or debris which can cause a short circuit. The continued use of the phototool may result in tiny scratches and abrasions on the phototool surface. The photoresists on which the phototool is placed, are usually laminated on sheet copper; small burrs or rough edges of holes bored in the copper sheet can cause scratches as the phototool is transferred from one photoresist to the next. The phototool is frequently wiped with a soft cloth to make sure it is dust and lint free because small particles of dirt can cause scratching as they are wiped across the phototool surface. Because of this general wear and tear on the phototool surface during normal use, the phototool must be frequently reinspected (after 20 to 50 exposures) to insure line continuity. Depending on the size and the intricacy of the phototool, manual microscopic inspections can take up to 2 to 3 hours.

The fact that phototools are vulnerable to scratching and that abrasion is a serious problem during the normal use of a phototool is confirmed by a number of patents claiming diazo-type emulsions having toughness and resistance to abrasion that are said to be useful in circuit board technology.

Protective overcoats for photographic elements are well known, and a wide variety of products have been proposed in the patent literature. As pointed out in U.S. Pat. No. 4,668,601, issued to Kistner, polyester films, coated with various kinds of pressure sensitive adhesives, have been laminated to image-bearing surfaces to protect the image. For example, U.S. Pat. No. 4,337,107 discloses laminating a film of cured epoxy-silane to produce a protective film exhibiting superior abrasion resistant properties. Because of their thickness (total of polyester base and adhesive layer) and differing refractive indices, the laminating films cause optical distortion and hence loss of resolution. In addition, air is often entrapped in the soft pressure-sensitive adhesive during the laminating process, causing the finished product to contain undesirable air bubbles. Thinner protective coatings can be obtained, and with the exclusion of air pockets, by coating the surfaces of photographic elements with liquid compositions. After application, the thin liquid coating is hardened to yield the desired protective coat. Epoxy-silanes are especially useful in such coatings because of their resistance to abrasion; epoxy-silanes have the additional benefit of adhering well to silver halide emulsions and to other substrates. Examples of photographic coatings based on epoxy-silane compounds may be found in U.S. Pat. Nos. 4,156,046, 4,293,606 and 4,337,107.

Acrylate esters, and in particular the polyurethane acrylates, also offer good resistance to abrasion. Compositions based on acrylates cure rapidly and produce coatings of excellent clarity. Photographic applications of acrylics for protective overcoats are described in U.S. Patent Nos. 4,333,998, 4,353,980 and 4,399,192.

In all cases, overcoats on photographic products must meet exacting requirements with respect to transparency, flexibility, adhesion, and thickness. But, in the case of phototools, even stricter requirements must be met. For example, phototools often require resolutions greater than one line pair/3 mil (76.2 micrometers). In addition, the thickness of the overlay may cause parallax during contact printing resulting in poor wall quality in the final printed circuit. While the above-mentioned epoxy-silanes adhere well to silver halide emulsions, the compositions described in these patents readily attack diazo coatings. When the liquid compositions are applied to the imaged surface of a diazo phototool, the liquids aggressively attack the diazo coating and render it unusable. The compositions are too aggressive as a solvent to be coated on a diazo phototool. While the above mentioned systems may be useful for their specified applications, they fall short of the demanding requirements for use on diazo phototools and other elements requiring abrasion resistance. The film laminates can be too thick and cause optical distortions and loss of resolution, and their soft adhesives can entrap air and environmental debris during lamination. The epoxy-silanes can aggressively attack the diazo emulsions and dissolve the developed images they are supposed to protect. The acrylates exhibit poor adhesion to silver halide type emulsions.

Another method of protecting diazo layers was disclosed in U.S. Pat. No. 3,136,637, issued to Larson, which describes plate or sheet structures comprising a base sheet having coated thereon a stable light-sensitive resin layer such as a light-sensitive diazo resin. Coated over and in contact with the light-sensitive material is an actinic light-transmitting film or layer of a hydrophobic water-insoluble solvent-softenable resin. The processing solutions disclosed remove unexposed diazo-resin/overcoat resin areas. They do not produce azo dye images. Further, these resins show poor permeability to ammonia and water vapor used to produce azo dye images.

U.S. Pat. No. 4,088,492, issued to Pope et al, describes the incorporation of hydroxyalkyl cellulose ether in a diazo type sensitizing coating composition or as an overcoat in order to permit rapid release of nitrogen during light exposure and to reduce slippage during roll-to-roll printing of diazo film materials. This coating increases roughness and would increase, rather than decrease, abrasion.

In some cases, in order to prevent damage, users of diazo phototools laminate a adhesive-backed clear polyester layer on top of the diazo layer after processing the diazo image. This protective polyester film is expensive and requires a lamination step which often traps foreign particles and air between the clear polyester film and the diazo surface. The adhesive may also increase background density during successive light exposure to photoresist.

Thus, there is a need in the art for a composition useful for coating diazo materials to protect the diazo material from chemical and physical damage. Particularly, there is a need in the art to provide a composition useful for coating diazo materials to at least partially protect the diazo material from abrasion. More particularly, there is a need for an efficient and economical protective coating for diazo materials.

SUMMARY OF THE INVENTION

The present invention relates to a water and ammonia permeable protective coating composition for diazo-containing materials comprising a cellulose ester and microcrystalline silica. The microcrystalline silica is provided in an amount sufficient to improve the abrasion-resistance of the diazo-containing materials. The amount of microcrystalline silica is such that abrasion-resistance is improved without significantly reducing resolution and acuity of the diazo-containing material or any image produced therefrom.

The invention further relates to a photographic element comprising a support, a diazo-containing material and a water and ammonia permeable coating composition which provides a protective coating for the diazo-containing material and comprises a cellulose ester and microcrystalline silica.

The invention further relates to a method for providing a protective coating on a diazo phototool comprising coating at least the surface of the diazo phototool containing diazo material with a composition comprising a cellulose ester and microcrystalline silica.

BRIEF DESCRIPTION OF THE DRAWINGS

FIG. 1 is a graphical representation of the relative abrasion resistance of various protective coating compositions.

DETAILED DESCRIPTION OF THE PREFERRED EMBODIMENTS

It surprisingly has been found that a protective coating composition for diazo-containing materials can be prepared from a cellulose ester and a relatively small amount of microcrystalline silica. The coating compositions of the invention provide improved protection for diazo-containing materials from physical and chemical damage. The protective coating compositions of the invention are particularly effective for protecting the diazo-containing materials from abrasion.

The protective coatings produce excellent overcoat layers which meet the strict requirements necessary for many diazo applications, including the requirements for diazo phototools. The protective coatings show good adhesion to the diazo film surface, maintain a discreet layer without significantly penetrating the diazo layer and are permeable to both ammonia and water vapor. Further, the protective coatings provide clear and transparent coatings in both visible and actinic light and maintain clarity during repeated exposure to ultraviolet light. Moreover, the protective coatings provide the above advantages while also producing a hard, abrasion/scratch resistant protective layer for the diazo-containing material.

The cellulose esters useful for preparing the protective coat in compositions of the present invention include those esters which may be generically called organic esters of cellulose. These esters are prepared by treating cellulose with a mixture of an acid and its anhydride or mixtures of organic acids and organic anhydrides. Useful cellulose esters include the cellulose acetates, cellulose propionates, cellulose acetate propionates, cellulose acetate butyrates or cellulose triacetates. These cellulose esters may be obtained from Eastman Chemicals, see publication No. P-160F, January, 1989. In the preferred embodiment, a cellulose acetate propionate (CAP) is used in the protective coating composition. Although any of the cellulose esters described may be used, cellulose acetate propionates have been found to provide the best results. Although not wishing to be bound by any theory, it is believed that cellulose acetate butyrates (CAB) are not as preferable since hydrolysis of CAB produces butyric acid which is olefactorily more undesirable than the propionic acid produced through hydrolysis of CAP. Moreover, the CAP resins typically provide a superior combination of solubility, glass transition temperature and Tukon hardness.

The amount of cellulose ester in the protective coating composition will depend on its solubility, viscosity and wet/dry coat thickness desired. Typically, the amount will range from about 5 to about 25 percent solids in the wet film. In a preferred embodiment, the coating composition will contain about 8 to about 15% solids in the wet film. Preferably, the coating composition will contain about 50 to about 99.9 percent cellulose ester, based on the total amount of dry coating composition.

The microcrystalline silica useful in the coating composition of the present invention may be any microcrystalline silica which is about 0.10 to about 15 microns in size derived from quartzite sand, sandstone, tripoli or novaculite. In particular, microcrystalline novaculite (novacite) silica which is about 0.10 to about 10.0 microns is preferred. A description of novaculite may be found in *Pigment Handbook*, T.C. Patton, Volume 1, pp. 157-159, Wiley, (1973).

It also is preferred that the silica used have a hardness level sufficient to improve abrasion-resistance. The silica preferably will have a hardness greater than 6 on the Mohs hardness scale. Novacite silica has a Mohs hardness of 7. Although not wishing to be bound by any theory, in addition to significantly improving abrasion/-scratch resistance, it is believed that the microcrystalline silica reduces or eliminates blocking or bricking of the diazo-containing materials and expedites the removal of air between the phototool and photoresist surfaces during contact light exposure of the photoresist material. Blocking and bricking is the tendency for a film to adhere to itself or whatever it is in contact with.

The amount of silica in the protective coating composition generally depends on surface roughness required to permit rapid air removal, in a vacuum frame for example, between phototool and photoresist surface, the resolution requirement of photoresist and the desired abrasion resistance. The microcrystalline silica should be used in an amount sufficient to improve the abrasion resistance of the diazo-containing materials without significantly adversely affecting the transparency of the protective coating composition. Morever, the amount of microcrystalline silica should be such that abrasion-resistance is improved without significantly reducing resolution and acuity of the diazo-containing material or any image produced therefrom. For example, when the protective coating compositions are used on phototools the resolution and acuity of the photoresist image should not be significantly reduced from the use of microcrystalline silica in the protective coating composition. Preferably, the amount of microcrystalline silica will range from about 0.1 to about 12 percent of the total coating composition (dry film). Most preferably, the coating composition (dry film) will contain about 0.5 to about 5 percent microcrystalline silica.

It has also been found that certain other types of polymers may be added to the protective coating compositions to improve or modify adhesion, hardness and scratch resistance, among other properties. The water and ammonia permeability of these resins must be equal or similar to that of the cellulose esters to permit development of the azo dye image from the diazo-containing material coated with the protective coating composition. The polymers which have been found useful in the cellulose ester and microcrystalline silica protective coating compositions of the present invention include clear and transparent polymers selected from the group consisting of acrylic resin, polyvinyl acetate resin, phenolic resin and graft polymers. Other polymers which may be useful include urea formaldehyde, polyester, silicone, maleic, fumaric or ketone aldehyde. The polymers must be transparent enough to at least transmit light in the visible and ultraviolet ranges. In a preferred embodiment of the present invention, polyvinyl acetate resin is added to the protective coating composition. It has been found that the addition of the polymer provides improved abrasion and scratch resistance.

The polymers blended with the cellulose ester polymer generally will be present in the total protective coating composition in an amount from about 0 % to about 80%, on a dry film basis. Preferably, the polymer resin is present in an amount from about 0% to about 50% of the dry film.

In addition to the cellulose ester, additive polymer, and microcrystalline silica, it may be desirable to add an abhesive-type compound to the protective coating composition. The addition of an abhesive or release compound has been found to provide additional improvement of the protective coating with respect to physical scratching, and, in some instances, chemical attack. These abhesive or release compounds which include materials which produce low energy surfaces include silicones, fluorinated polymers or waxes. In particular, suitable abhesive compounds are the polysiloxanes and related silicone-based materials, such as silicone resins. A particularly preferred group of polysiloxanes useful in the protective coatings of the present invention are polyalkylene oxide modified dimethyl polysiloxanes.

The abhesive compound generally will be present in the protective coating composition in an amount of about 0% to about 2%. Preferably, the abhesive compound is present in an amount of about 0% to about 0.5%.

In addition to the above-mentioned components, the protective coating layer of the present invention can include an organic acid, such as sulfosalicylic or toluene sulfonic acid. The organic acid has been found to protect the diazo layer from chemical attack from ambient ammonia or amines which can cause precoupling of the diazonium and couplers to produce the azo dye during storage or use. Although not wishing to be bound by any theory, it is believed that the acid acts as an "interceptor" or "scavenger" for volatile alkaline materials and neutralizes them before the materials reach the diazo layer. A preferred organic acid is paratoluene sulfonic acid. The organic acid preferably is used in an amount of about 0.10 to about 1.0% in the dry film.

The protective coating compositions of the present invention typically are prepared by dissolving the various components in suitable solvents using conventional mixing and dispersing equipment.

The protective coating compositions may be used in any application in which a diazo-containing material requires improved durability or abrasion/scratch resistance. Examples of such applications include the preparation of photographic elements, microfilm, overhead transparencies, phototools, lithographic printing plates and photoresist. The protective coating compositions are particularly useful for phototool elements.

In one embodiment of the invention, a method for providing a protective coating on a diazo phototool is provided comprising coating at least the surface of the diazo phototool containing diazo material with a composition comprising a cellulose ester and microcrystalline silica. The phototool may be prepared by any method known in the art. The diazo phototool is prepared by applying a diazo-containing lacquer to a transparent film base and evaporating the solvents to produce a continuous diazo-containing layer on the prebonded clear substrate. Typically, a support material, such as polyester or polyethylene terephthalate (PET) will be coated with a layer of diazo-containing material. The protective coating composition then is coated by any known coating procedure, such as gravure, reverse roll, between-the-rolls, direct offset, extrusion or wire-wound rod or with a coating bar to the preferred thickness. The coated diazo-containing material then may be dried by any standard procedure.

The dry film thickness of the protective coating should be adjusted to provide maximum scratch/abrasion protection and allow full development of the azo dye image within two to three passes through a commercial developing device. Preferably, the dry film thickness of the protective coating will range from about 1$\mu$ to about 12$\mu$.

A typical phototool will have a support material such as PET, a bond coating, an image layer and a protective layer.

The following examples are provided to further illustrate the invention, but are not meant to limit the scope of the invention in any way.

EXAMPLES

Examples 1-26

Table 1 shows the composition of 26 formulations of protective coating compositions. Examples 1-8; 10-15; 17-20 and 24-26 contained microcrystalline silica. Examples 9 and 16 are comparative examples using amorphous silica. Examples 21-23 did not contain any silica. Examples 12 and 24-26 illustrate the results when this amount is gradually increased. The formulations were prepared as follows:

The resins were dissolved in the solvent blend until a clear solution resulted. The remaining components were then added to the resin solution.

For each of the 26 examples, a support material of 7 mil prebonded PET film then was coated with a layer of diazo-containing material, at 10 $\mu$ dry film thickness. The diazo-containing material contained 14.28% solids. The diazo formulation included 38.58% methyl ethyl ketone as a solvent, 38.58% methanol as a solvent, 8.56% ethylene glycol monomethyl ether as a solvent, 0.009% 5-sulfosalicylic acid as a stabilizer, 0.17% zinc chloride as a stabilizer, 1.44% rescorcinol as a coupler, 10.6% cellulose ester resin as a binder and 1.99% 4-dialkylamino benzene diazonium fluoroborate as the light-sensitive ingredient. The surface of the diazo-containing material then was coated with one of the 26 formulations given in Table 1 by a Baker coating bar to a wet film thickness of 4 mil Each of the examples then were dried for two minutes at 80° C. in an air circulated oven, Blue M Electric Company, Model Powermatic 70. The dry film thicknesses of the protective layers were 0.15±0.01 mils (3.75±1$\mu$).

Each of the examples were then imaged using an exposure device such as a Berkey ASCOR vacuum printer. The ammonia developer was Technifax model 6000 Dry Developer. The test master was placed over the standard diazo control material, being sure the sensitized side of the sample was toward the light source. The exposure time then was determined so as to give a density in the first step of a standard 21 step photographic step wedge, a density of between 0.05 and 0.10 density units.

The examples then were fully developed in the Model 6000 Dry Developer to form the azo dye print using the proper exposure time as determined by the standard.

The 26 samples and a control sample which did not contain any protective coating layer were tested for development rate and abrasion resistance. The development rate illustrates the water and ammonia permeability through the protective resin layer. The abrasion resistance test illustrates the percent optical density retained after receiving a specified number of abrasive strokes.

Table 2 shows the results of the tests for development rate. The control developed 99% of the potential density by the second pass through developer unit.

Table 3 shows the results of the tests for abrasion resistance. The abrasion tests were conducted using an A.A.T.C.C. (American Association of Textile Chemists and Colorists) Crockmeter, model CM-5, Atlas Electric Devices, equipped with steel wool, various grades.

The best combination overall appeared to be provided by Example 4 which showed good abrasion resistance and good development. The addition of an increased amount of polysiloxanes in examples 15 and 17 showed improved abrasion resistance without impairing ammonia development. The results also indicate that microcrystalline silica significantly improves abrasion resistance even in relatively small amounts compared to coatings without microcrystalline silica while the amorphous silica used in Examples 9 and 16 showed little abrasion improvement over the control with no protective coating.

Example 27

FIG. 1 graphically depicts the relative abrasion resistance of the following compositions prepared as described ○-diazo phototool with no overcoat layer similar to the diazo formulation described on page 14.

⊕-a protective coating composition containing cellulose acetate propionate and solvent similar to Example 21. (no microcrystalline silica)

△-a protective coating composition containing cellulose acetate propionate and a release agent, polysiloxane. (no microcrystalline silica)

+-a protective coating composition according to the present invention containing cellulose acetate propionate, polysiloxane, microcrystalline silica and paratoluene sulfonic acid (see Example 1).

As shown in FIG. 1, the composition according to the present invention displays much greater abrasion resistance than the other compositions.

From the foregoing description, various modifications and changes in the coating composition or method of providing a protective coating composition will occur to those skilled in the art. All such modifications coming within the scope of the appended claims are intended to be included therein.

TABLE 1

| Example | 1 | 2 | 3 | 4 | 5 | 6 | 7 | 8 | 9 | 10 | 11 | 12 | 13 |
|---|---|---|---|---|---|---|---|---|---|---|---|---|---|
| Acetone | 39.09 | 39.09 | 39.09 | 39.09 | 39.09 | 39.09 | 39.09 | 39.09 | 39.09 | 39.09 | 39.09 | 39.09 | 39.09 |

TABLE 1-continued

| | | | | | | | | | | | | |
|---|---|---|---|---|---|---|---|---|---|---|---|---|
| Methanol | 39.98 | 39.98 | 39.98 | 39.98 | 39.98 | 39.98 | 39.98 | 39.98 | 39.98 | 39.98 | 39.98 | 39.98 | 39.98 |
| Propylene Glycol Monomethyl ether | 6.26 | 6.26 | 6.26 | 6.26 | 6.26 | 6.26 | 6.26 | 6.26 | 6.26 | 6.26 | 6.26 | 6.26 | 6.26 |
| Butyl acetate | 2.68 | 2.68 | 2.68 | 2.68 | 2.68 | 2.68 | 2.68 | 2.68 | 2.68 | 2.68 | 2.68 | 2.68 | 2.68 |
| Microcrystalline silica-A | 0.0538 | 0.0538 | 0.0538 | 0.0538 | 0.0538 | 0.0538 | 0.0538 | 0.0538 | — | 0.0538 | 0.0538 | 0.0538 | 0.0538 |
| Para Toluene sulfonic acid | 0.1075 | 0.1075 | 0.1075 | 0.1075 | 0.1075 | 0.1075 | 0.1075 | 0.1075 | 0.1075 | 0.1075 | 0.1075 | 0.1075 | 0.1075 |
| Polysiloxane additive (Dow 54) | 1.075 | 1.075 | 1.075 | 1.075 | 1.075 | 1.075 | 1.075 | 1.075 | 1.075 | 1.075 | — | — | 1.075 |
| Cellulose Acetate Propionate resin | 10.75 | — | — | 5.37 | 5.37 | 5.37 | 5.37 | — | 10.75 | 10.75 | 10.75 | 10.75 | 10.75 |
| Cellulose Acetate Butyrate resin | | 10.75 | | | | | | | | | | | |
| Cellulose Acetate resin | | | 10.75 | | | | | | | | | | |
| Polyvinyl acetate resin | | | | 5.37 | | | | | | | | | 10.75 |
| Acrylic copolymer (Surcol 446) | | | | | 5.37 | | | 10.75 | | | | | |
| Acrylic copolymer (Joncryl 58x) | | | | | | 5.37 | | | | | | | |
| Phenolic resin | | | | | | | 5.37 | | | | | | |
| Synthetic Amorphous silica (Syloid 244) | | | | | | | | | 0.0538 | | | | |
| Sulfosalicylic acid | | | | | | | | | | 0.144 | | | |
| Silicone resin (1) (BYK 301) | | | | | | | | | | | 1.075 | | |
| Nonionic Polyalkylene oxide modified dimethyl polyoxolane (1) (Silwet 7602) | | | | | | | | | | | | | |
| Microcrystalline Silica (TAMMSCO) | | | | | | | | | | | | 1.075 | |
| Amorphous Silica (Sansil KU-33) | | | | | | | | | | | | | |
| Fluoro Chemical Surfactant | | | | | | | | | | | | | |

| Example | 14 | 15 | 16 | 17 | 18 | 19 | 20 | 21 | 22 | 23 | 24 | 25 | 26 |
|---|---|---|---|---|---|---|---|---|---|---|---|---|---|
| Acetone | 39.09 | 39.09 | 39.09 | 39.09 | 39.09 | 39.09 | 39.09 | 39.09 | 39.09 | 39.09 | 39.09 | 39.09 | 39.09 |
| Methanol | 39.98 | 39.98 | 39.98 | 39.98 | 39.98 | 39.98 | 39.98 | 39.98 | 39.98 | 39.98 | 39.98 | 39.98 | 39.98 |
| Propylene Glycol Monomethyl ether | 6.26 | 6.26 | 6.26 | 6.26 | 6.26 | 6.26 | 6.26 | 6.26 | 6.26 | 6.26 | 6.26 | 6.26 | 6.26 |
| Butyl acetate | 2.68 | 2.68 | 2.68 | 2.68 | 2.68 | 2.68 | 2.68 | 2.68 | 2.68 | 2.68 | 2.68 | 2.68 | 2.68 |
| Microcrystalline silica-A | — | 0.0538 | — | 0.0538 | 0.0538 | 0.0538 | 0.0538 | — | — | — | .1076 | .215 | .690 |
| Para Toluene sulfonic acid | 0.1075 | 0.1075 | 0.1075 | 0.1075 | 0.1075 | 0.1075 | 0.1075 | 0.1075 | 0.1075 | 0.1075 | 0.1075 | 0.1075 | 0.1075 |
| Polysiloxane additive (Dow 54) | 1.075 | 5.375 | 1.075 | — | — | — | — | 1.075 | 1.075 | 1.075 | 1.075 | 1.075 | 1.075 |
| Cellulose Acetate Propionate resin | 10.75 | 10.75 | 10.75 | 10.75 | 10.75 | 10.75 | 10.75 | 10.75 | — | — | 10.75 | 10.75 | 10.75 |
| Cellulose Acetate Butyrate resin | | | | | | | | | | 10.75 | | | |
| Cellulose Acetate resin | | | | | | | | | 10.75 | | | | |
| Polyvinyl acetate resin | | | | | | | | | | | | | |
| Acrylic copolymer (Surcol 446) | | | | | | | | | | | | | |
| Acrylic copolymer (Joncryl 58x) | | | | | | | | | | | | | |
| Phenolic resin | | | | | | | | | | | | | |
| Synthetic Amorphous silica (Syloid 244) | | | | | | | | | | | | | |
| Sulfosalicylic acid | | | | | | | | | | | | | |
| Silicone resin (1) (BYK 301) | | | | 5.375 | | | | | | | | | |
| Nonionic Polyalkylene oxide modified dimethyl polyoxolane (1) (Silwet 7602) | | | | | | | 5.375 | | | | | | |
| Microcrystalline Silica (TAMMSCO) | 0.0538 | | | | | | | | | | | | |
| Amorphous Silica (Sansil KU-33) | | | 0.0538 | | | | | | | | | | |
| Fluoro Chemical Surfactant | | | | | 1.075 | 5.375 | | | | | | | |

TABLE 2

| | Percent of Full Development (2) | | | | | | | | | | | | | |
|---|---|---|---|---|---|---|---|---|---|---|---|---|---|---|
| | Control | 1 | 2 | 3 | 4 | 5 | 6 | 7 | 8 | 9 | 10 | 11 | 12 | 13 |
| Pass 1 | 94 | 88 | 86 | 86 | 96 | 71 | 88 | 56 | 68 | 80 | 88 | 85 | 87 | 96 |
| Pass 2 | 99 | 97 | 99 | 98 | 98 | 98 | 99 | 86 | 88 | 98 | 98 | 99 | 99 | 96 |
| | Control | 14 | 15 | 16 | 17 | 18 | 19 | 20 | 21 | 22 | 23 | 24 | 25 | 26 |
| Pass 1 | 94 | 99 | 97 | 99 | 94 | 96 | 97 | 95 | 96 | 88 | 89 | 91 | 90 | 90 |
| Pass 2 | 99 | 100 | 100 | 100 | 99 | 99 | 100 | 95 | 99 | 98 | 98 | 99 | 98 | 99 |

(1) 10% solution of acetone
(2) Percent of maximum obtainable visual density
(3) AATCC crockmeter, model cm-5
(4) Control - No topcoat

TABLE 3

| | | | Abrasion Test (3) Steel wood Rubs (% Density Remaining) | | | | | | | | | | | | |
|---|---|---|---|---|---|---|---|---|---|---|---|---|---|---|---|
| | Control | (4) | 1 | 2 | 3 | 4 | 5 | 6 | 7 | 8 | 9 | 10 | 11 | 12 | 13 |
| Grade 0000 | 50 | 32 | | | | | | | | | | | | | 29 |
| | 100 | 30 | | | | | | | | | | | | | 11 |
| Grade 0 | 100 | 11 | 90 | 61 | 51 | 100 | 86 | 97 | 80 | 78 | 25 | 85 | 96 | 93 | 21 |
| | 200 | | 81 | 59 | 49 | 100 | | 12 | 70 | 42 | 14 | 80 | 80 | 76 | |
| | 400 | | 54 | 17 | 38 | 100 | 71 | 6 | 65 | 22 | 6 | 60 | 79 | 72 | |
| | Control | (4) | 14 | 15 | 16 | 17 | 18 | 19 | 20 | 21 | 22 | 23 | 24 | 25 | 26 |
| Grade 0000 | 50 | 32 | | | | | | | | | | | | | |
| | 100 | 30 | | | | | | | | | | | | | |
| Grade 0 | 100 | 11 | 97 | 98 | 19 | 98 | 91 | 86 | 84 | 30 | 20 | 22 | 100 | 100 | 100 |
| | 200 | | 89 | 97 | 12 | 73 | 67 | 84 | 82 | 18 | 10 | 12 | 97 | 100 | 100 |
| | 400 | | 55 | 98 | 2 | 70 | 65 | 80 | 3 | 6 | 3 | 3 | 80 | 100 | 100 |

(1) 10% solution of acetone
(2) Percent of maximum obtainable visual density
(3) AATCC crockmeter, model cm-5
(4) Control - No topcoat

We claim:

1. A photographic element comprising a support, a layer of a diazo-containing material comprising a diazonium compound and a coupler compound, and a water and ammonia permeable protective coating for the layer of diazo-containing material, which protective coating is comprised of a cellulose ester and microcrystalline silica.

2. The photographic element of claim 1 wherein the microcrystalline silica is present in an amount sufficient to improve the abrasion-resistance of said element without reducing optical clarity.

3. The photographic element of claim 1 wherein cellulose ester is a cellulose acetate propionate, cellulose acetate butyrate or cellulose acetate.

4. The photographic element of claim 3 wherein the cellulose ester is a cellulose acetate propionate.

5. The photographic element of claim 1 wherein the coupler is a rescorcinol compound.

6. The photographic element of claim 1 further comprising a clear and transparent polymer selected from the group consisting of acrylic polyvinyl acetate, phenolic and graft polymer.

7. The photographic element of claim 6 further comprising an abhesive composition selected from the group consisting of silicone resins and polysiloxanes.

8. The photographic element of claim 1 wherein the element is a phototool.

9. The photographic element of claim 7 further comprising an organic acid.

10. The photographic element of claim 1 wherein the microcrystalline silica is present in an amount of about 0.1 to 12% per weight of dry protective coating.

11. A protective coating composition for diazo-containing materials comprising
a cellulose ester which is cellulose acetate propionate, cellulose acetate butyrate or cellulose acetate,
microcrystalline silica,
a clear and transparent polyvinyl acetate polymer,
an abhesive composition comprised of a polyalkylene oxide modified dimethyl polysiloxane, and
an organic acid, said composition having water and ammonia permeability as a coating on a layer of diazo-containing material.

12. The coating composition of claim 11, wherein the organic acid is a paratoluene sulfonic acid.

13. A photographic element comprising a support, a diazo material and a water and ammonia permeable protective coating for the diazo material, which protective coating is comprised of a cellulose ester which is a cellulose acetate propionate, cellulose acetate butyrate or cellulose acetate, microcrystalline silica, a clear and transparent polymer selected from the group consisting of acrylic, polyvinyl acetate, phenolic and graft polymer, an abhesive composition selected from the group consisting of silicone resins and polysiloxanes, and an organic acid.

14. The photographic element of claim 13, wherein the organic acid is paratoluene sulfonic acid.

15. A method for providing a protective coating on a diazo phototool comprising coating at least the surface of the diazo phototool containing diazo material with a composition comprising a cellulose ester which is a cellulose acetate propionate, cellulose acetate butyrate or cellulose acetate, microcrystalline silica, a clear and transparent polymer selected from the group consisting of acrylic, polyvinyl acetate, phenolic and graft polymer, an abhesive composition selected from the group consisting of silicone resins and polysiloxanes, and an organic acid.

16. The method of claim 15 wherein the organic acid in the composition is paratoluene sulfonic acid.

17. The coating composition of claim 11 wherein the composition is transparent.

* * * * *